Aug. 8, 1950          R. D. DODGE          2,517,989

CASE SHIFT MECHANISM FOR TYPEWRITING MACHINES

Filed June 25, 1947          6 Sheets-Sheet 1

INVENTOR
RONALD D. DODGE
ATTORNEY

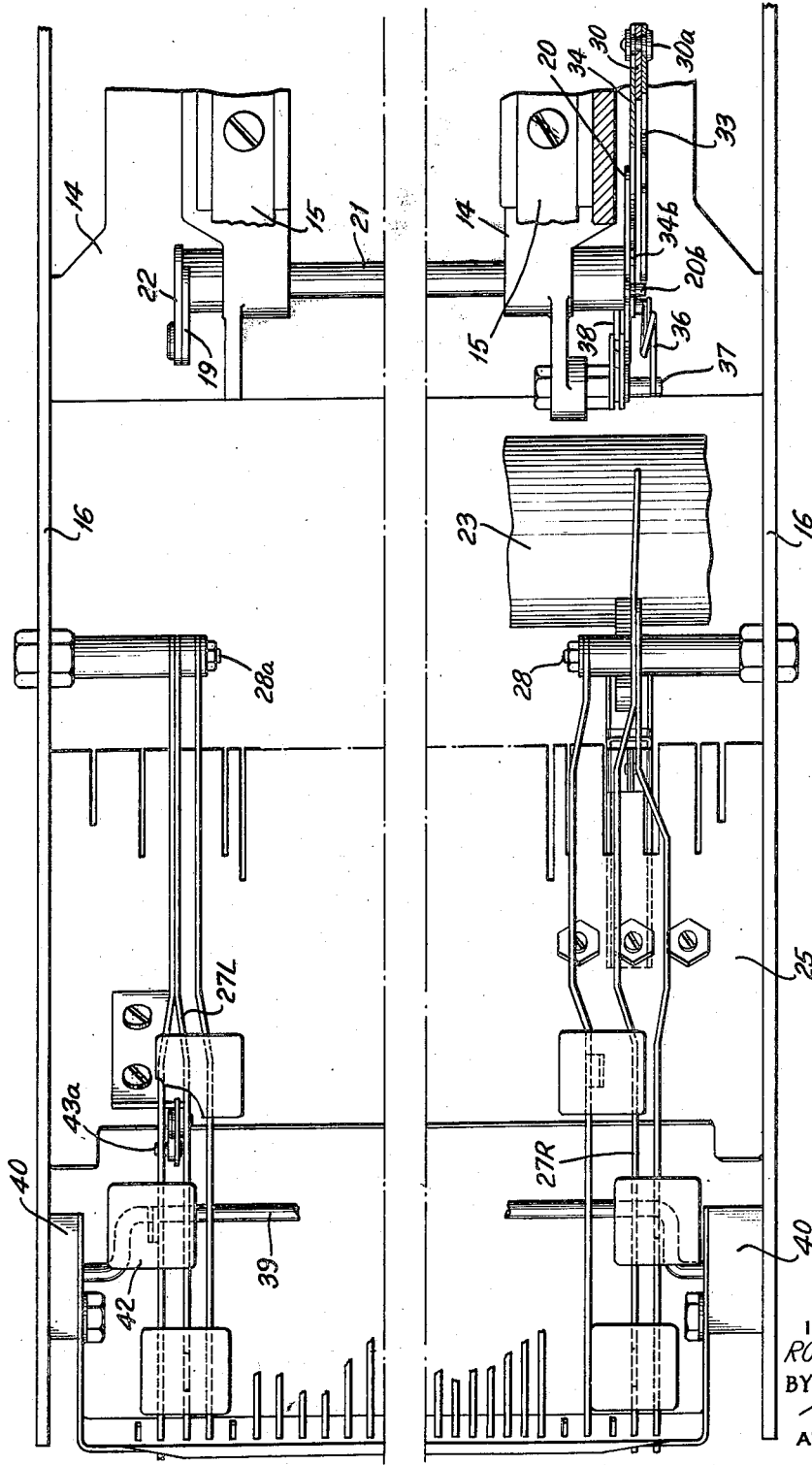

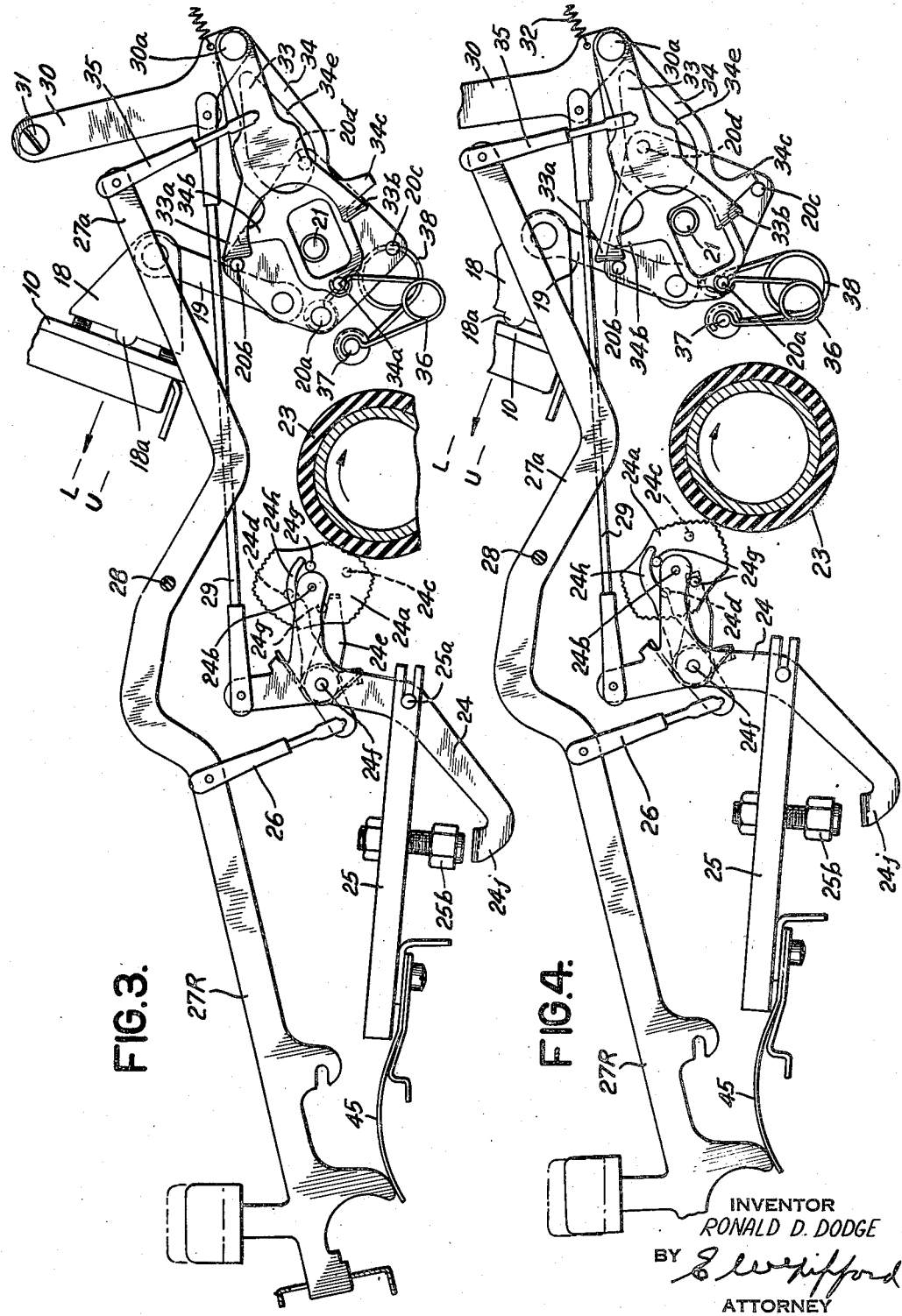

Aug. 8, 1950 R. D. DODGE 2,517,989
CASE SHIFT MECHANISM FOR TYPEWRITING MACHINES
Filed June 25, 1947 6 Sheets-Sheet 4

INVENTOR
RONALD D. DODGE
BY
ATTORNEY

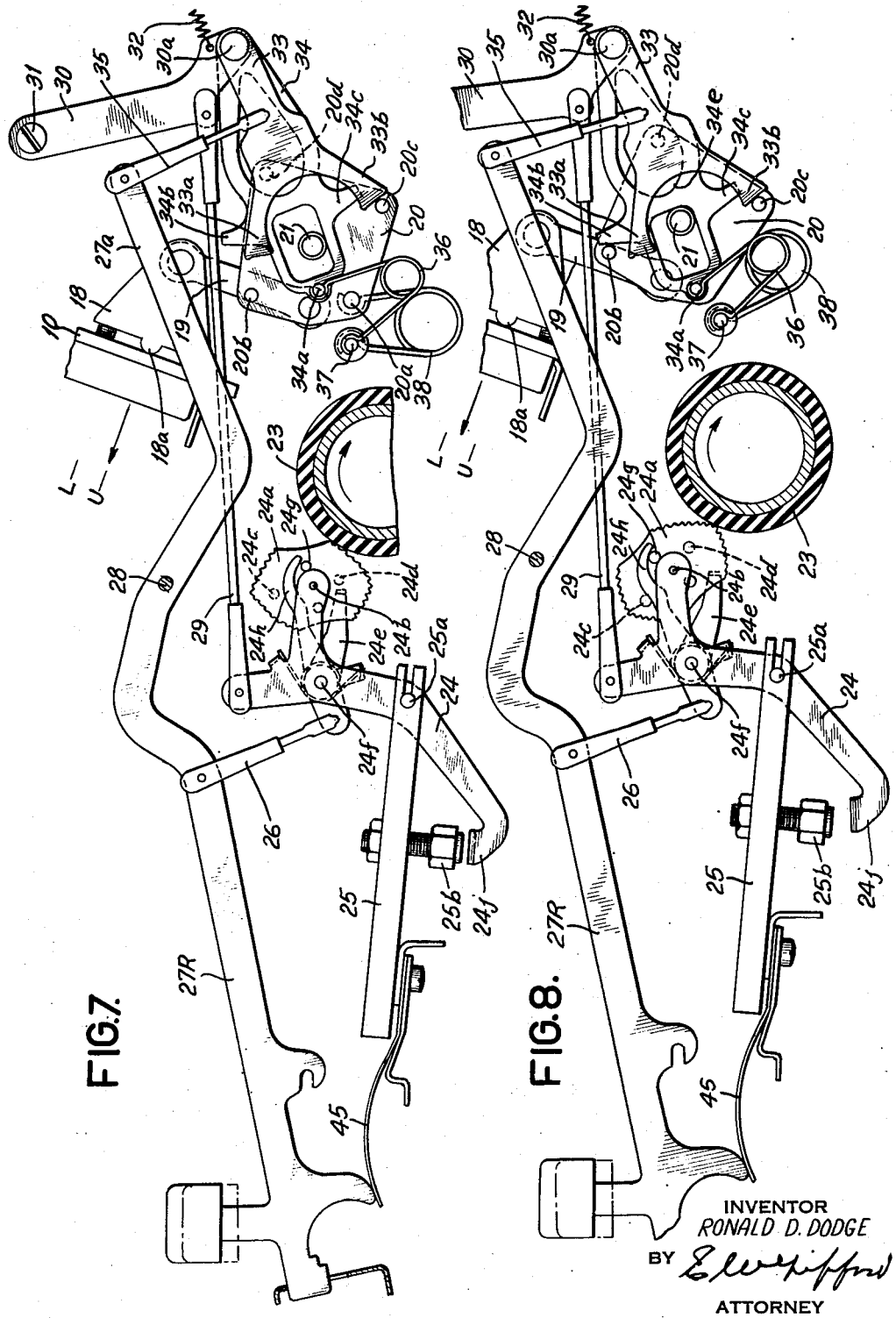

Aug. 8, 1950 R. D. DODGE 2,517,989
CASE SHIFT MECHANISM FOR TYPEWRITING MACHINES
Filed June 25, 1947 6 Sheets-Sheet 6

INVENTOR
RONALD D. DODGE
BY
ATTORNEY

Patented Aug. 8, 1950

2,517,989

UNITED STATES PATENT OFFICE 2,517,989

CASE SHIFT MECHANISM FOR TYPEWRITING MACHINES

Ronald D. Dodge, Poughkeepsie, N. Y., assignor to International Business Machines Corporation, New York, N. Y., a corporation of New York Application June 25, 1947, Serial No. 756,921

9 Claims. (Cl. 197—74)

This invention relates to typewriting machines.

The primary object of the present invention is to provide an improved case shift mechanism.

An object is to provide a case shift mechanism which is quieter and smoother in its operation than prior shift mechanisms.

Another object is to provide a shift mechanism which is more suitable for use in power-operated typewriters.

An object is to provide a power-operated shift mechanism which is smoother and quieter in its operation than prior shift mechanisms operated by power.

Other objects of the invention will be pointed out in the following description and claims and illustrated in the accompanying drawings, which disclose, by way of example, the principle of the invention and the best mode, which has been contemplated, of applying that principle.

In the drawings:

Fig. 2 is a plan view of the mechanism shown in Fig. 1.

Fig. 3 is a view similar to Fig. 1 but showing the shift key depressed and the type basket about to be shifted to upper case position.

Fig. 4 is a view showing the type basket in an intermediate position.

Fig. 7 is a view showing the shift key released and the cam unit partly operated but with the type basket still in upper case position.

Fig. 8 is a view somewhat similar to Fig. 4 showing the cam unit partly operated toward the lower case or normal position.

Figure 1:
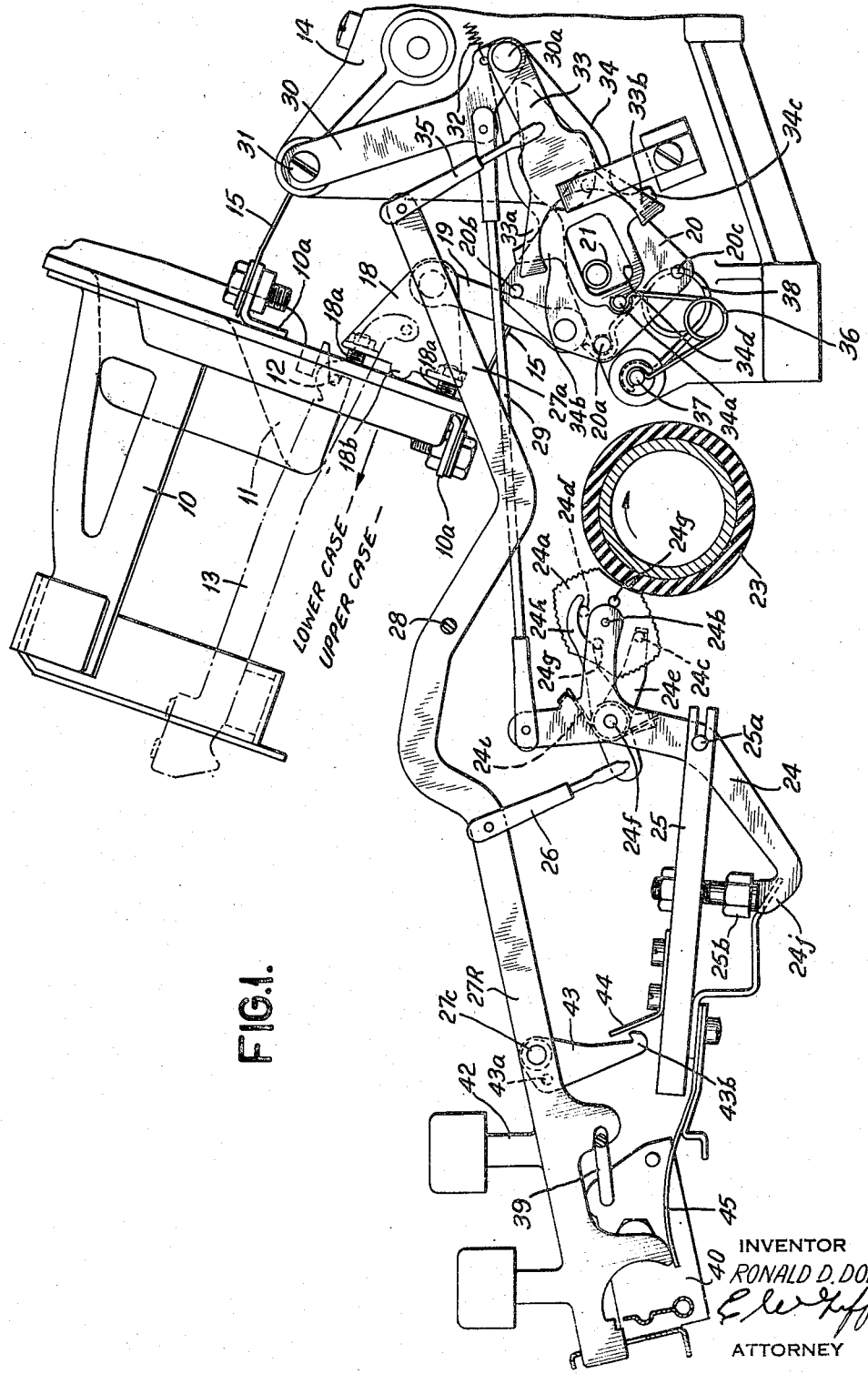
Fig. 1 is a vertical section showing, in normal or lower case position, a power-operated shift mechanism constructed according to the present invention.

In the drawings 10 generally designates the frame of the usual type basket of which the segment 11 forms part. The segment 11 may be of a form commonly used in the art known as a "wire segment" on which the type bars are pivoted by means of a curved pivot wire 12. Only one type bar 13 is shown but it will be understood that there are as many type bars as there are character keys in accordance with usual custom in the typewriter art. The type basket 10 is fabricated from sheet metal frame parts which include bent-over lugs like 10a supporting the type basket in the stationary frame 14 by means of leaf springs 15, there being an upper pair of leaf springs and a lower pair of leaf springs which act like parallel motion linkages to compel the type basket 10 to move substantially linearly for the short movement necessary between the two case shift positions thereof.

Figures 9, 10:
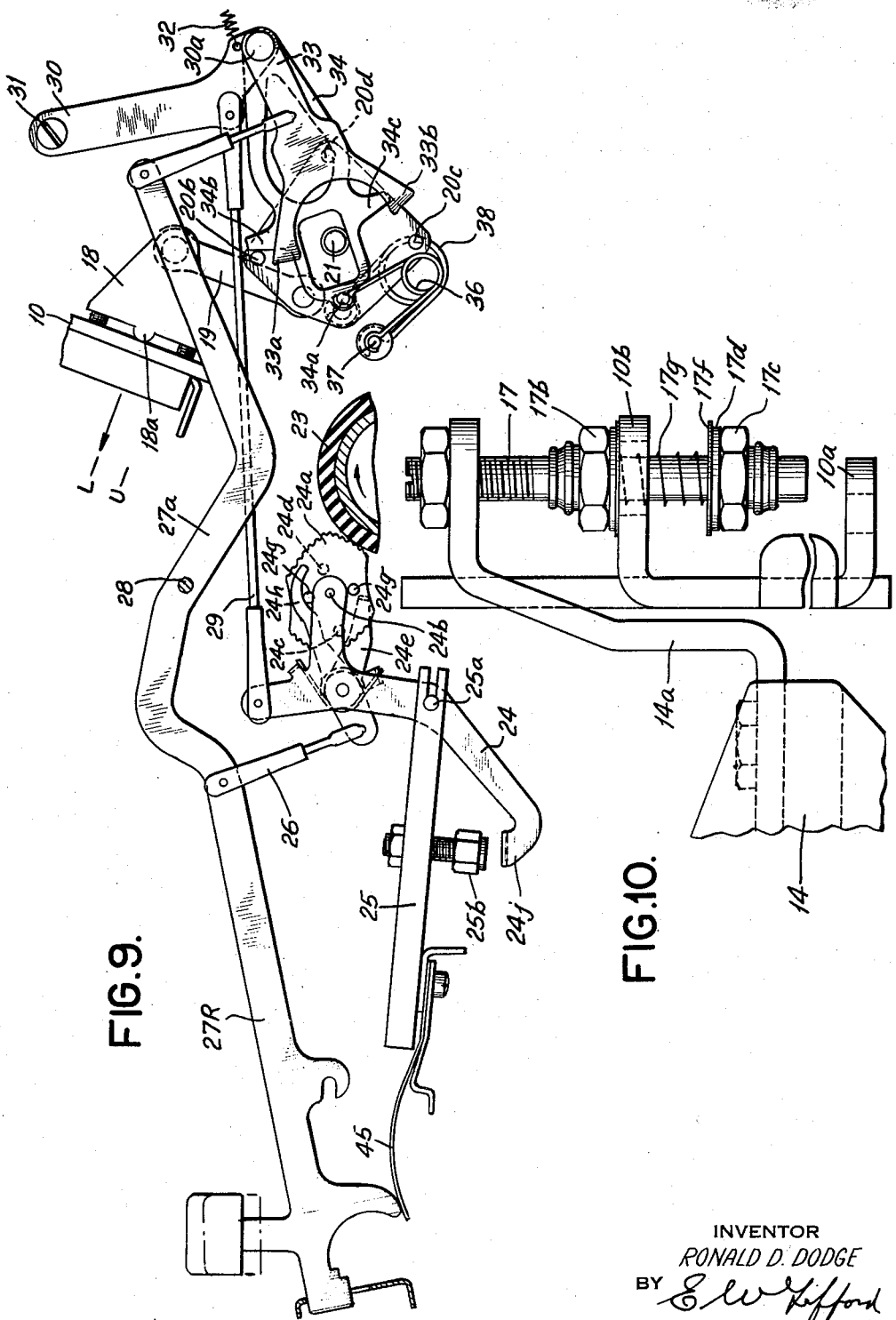
Fig. 9 is a view somewhat similar to Fig. 5 showing the type basket back in lower case position but with the cam unit almost completely restored to normal position.
Fig. 10 is a detail view of the type basket stops.

Any suitable stops may be provided for limiting movement of the type basket and holding it in upper and lower case positions but it is preferred to use the form shown in Fig. 10.

The type basket 10 is provided with two lugs 10b, one adjacent each side plate 16 of the machine framework, and having holes considerably larger than the two stop screws 17 passing through the holes and threaded into the brackets 14a secured to frame 14 adjacent the side plates 16. Two stop nuts 17b, 17c are threaded on each screw 17, one on each side of the adjacent lug 10b, the nut 17b arresting the type basket in lower case position by contacting the face of lug 10b, while nut 17c serves a similar purpose for the upper case position.

In order to reduce noise, a metal washer 17d and a non-metallic washer 17f, preferably made of a resilient plastic, are interposed between each nut 17b, 17c and lug 10b. A coil spring 17g interposed between the washers 17f prevents the washers 17d from chattering against the nuts 17b, 17c, when the type basket is shifted, by holding washers 17d against the stop nuts 17b, 17c.

The shifting force is applied to the type basket by means of a pair of clevis brackets 18 (Fig. 1) of which there are two, one on each side of the type basket, each secured to the back of the type basket by a pair of bolts 18a. The brackets 18 are formed from sheet metal and, in the process of forming each, two rounded lugs 18b are struck which act as rocker pivots for the bracket, the arms of the bracket preventing the nuts of bolts 18a from turning. By suitably turning the bolts 18a with a screw driver, the brackets 18 may be rotated on the lugs 18b to adjust the linkages and operating parts connected to the brackets 18 to correspond to adjustments of the type basket stops 17b, 17c.

As a convenience in explaining the invention,

Figs. 1 and 3 to 9 show a sequence of operations involving a shift of the type basket from the uppermost, or lower case position, to the upper case position and return to lower case position. To facilitate identifying the successive positions of the type basket, Figs. 1 and 3 to 9 have been provided with an arrow with its axis passing through the center of lug 18b at right angles to the motion of the type basket. The captions "Lower Case" and "Upper Case" in Fig. 1, and L and U, respectively, in Figs. 3 to 9, for brevity, denote the position of the basket in each figure by the relation of the arrow to these captions and their letter equivalents.

The bracket 18 nearest the right hand side plate 16 of the machine, which is the lowest in Fig. 2, is connected by link 19 (Fig. 1) to a plate 20 secured on a cross shaft 21 journaled in the frame 14. The bracket 18 nearest the left hand side plate 16 of the machine, that is the upper one in Fig. 2, is connected by a similar link 19 to an arm 22 secured to the shaft 21. By rotating the shaft 21 and the plate 20 and arm 22 in a counterclockwise direction (Fig. 1), the links 19 will draw the type basket 10 down from the lower case position L to the upper case position U. In Fig. 1 the type basket is in lower case position as indicated by the position of the arrow opposite the caption "Lower Case."

For the purpose of rotating the plate 20 and shaft 21 there is provided power-operated case shift mechanism actuated by the power roller 23 which rotates continually in the direction of the curved arrows while the machine is in use. This power mechanism includes a cam unit 24 pivoted on a cross rod 25a carried by a frame plate 25 suitably secured to the side plates 16.

The cam unit 24 includes a cam 24a rotatably pivotally mounted at 24b in the frame of the cam unit. The cam has two stop pins 24c, 24d of which the pin 24c normally is engaged by a lug on a release lever 24e pivoted at 24f in the frame of the cam unit 24. The release lever 24e is connected by a link 26 to the right hand shift key 27R which is pivoted on a stud 28 (see Fig. 2 also) carried by the right hand plate 16.

The cam 24a also is provided with a pair of pins 24g located on diametrically opposite sides of the pivot 24b of the cam 24a and one of these pins 24g is engaged by an arm 24h which is also pivoted at 24f and is urged in a clockwise direction by a torsion spring 24i partially coiled around the pivot 24f and engaging a fixed part of the frame of the cam unit 24. By engaging the upper left hand pin 24g (Fig. 1) the arm 24h tends to rotate the cam 24a in a counterclockwise direction but engagement of the lug on the release lever 24e with the pin 24c prevents such movement. In this position the power roller 23 turns freely in one of two arcuate cut-out portions formed in the cam 24a.

The frame of the cam unit 24 is connected by a link 29 to a lever 30 pivoted at 31 in the frame 14. The lever 30 is urged in a counterclockwise direction by a spring 32 anchored to a fixed part of the machine. This spring holds a stop arm 24j formed in the frame of the cam unit 24 against a stop screw 25b carried by the frame member 25. By adjusting the screw 25b the clearance between the cam 24a when the power roller 23 is in one of the arcuate portions of cam 24a may be regulated.

Pivoted at 30a on the lever 30 is an actuating member 33 and a buffer member 34, the actuating member 33 being connected by a link 35 with an extension 27a of the right hand shift key 27R. The buffer member 34 has a pin 34a connected by a toggle spring 36 to a fixed pin 37 carried by the frame 14. The plate 20 is also connected by a toggle spring 38 with the pin 37, the plate 20 being provided with a pin 20a for this purpose.

The plate 20 is also provided with a pair of pins 20b, 20c designed to cooperate with the members 33, 34. For this purpose the member 33 is bifurcated to form the arms 33a, 33b designed to cooperate with the pins 20b, 20c, respectively. The member 34 has buffer lugs 34b, 34c similarly designed to cooperate with the pins 20b, 20c and also has a large rectangular opening 34d, the upper longer edge of which in Fig. 1 is held in engagement with the shaft 21 by virtue of the action of the toggle spring 36 which in the normal position of the parts, that is, the lower case position, tends to urge the buffer member 34 in a counterclockwise direction. The spring 38, however, tends to urge the plate 20 in a clockwise direction, thereby assisting springs 15 in holding the type basket in its upper case position.

The buffer member 34 also has a large opening 34e shaped like a tear drop, more clearly shown in Fig. 3, and the plate 20 has a pin 20d, more clearly shown in Fig. 4, extending into the opening 34e for a purpose to be made clear hereinafter.

With the parts shown in the lower case position of Fig. 1, the extension 33a and the lug 34b occupy a position just below the pin 20b while the extension 33b and the lug 34c are in the arcuate path of movement of the pin 20c but are separated from said pin by a considerable gap.

The operation of the shift mechanism will now be described with reference to Figs. 1 and 3 to 9 which show the sequence of operation from lower case position to upper case position and back to lower case position, this cycle arising from depressing the shift key and holding it down long enough to print at least one upper case character.

When the shift key is depressed, as shown in Fig. 3, the link 26 moves downwardly and rocks the release lever 24e counterclockwise, thereby freeing the lug on the release lever from engagement with the pin 24c. Thereupon the arm 24h, by downward pressure on the left hand pin 24g, rocks the cam 24a counterclockwise and engages the serrated tread portion of the cam 24a with the power roller 23. The power roller 23 thereupon starts to rotate the cam 24a, Fig. 3 showing the cam partly rotated. At the same time the shift key 27 is depressed, the extension 27a raises the link 35 and thereby rocks the actuating member 33 in a clockwise direction to position the branch 33a in the arcuate path of movement of the pin 20b. Due to the partial rotation of the cam 24a, the cam unit 24 is rocked slightly counterclockwise in Fig. 3, thereby drawing the link 29 slightly to the left to engage the branch 33a with the pin 20b. The operation of the shift key 27, in raising the actuating member 33, lifts the lower lug 33b out of the path of arcuate movement of the pin 20c.

Movement of the cam 24a through approximately 90° causes the branch 33a to move to the left, thereby actuating the plate 20 in a counterclockwise direction. This carries the pin 20a on the plate 21 to the position of Fig. 4 in which the toggle spring 38 is carried beyond a dead center position with respect to the pin 37. Thus, when the pin 20a reaches the position of Fig. 4, the cam unit 24 has actuated the member 33 as far as it will go and the toggle spring 38 now exerts force on the plate 20 to continue its rotation in a counterclockwise direction and thereby continue the shifting movement of the type basket 10 downwardly to upper case position through the links 19.

Since the buffer member 34 is not raised when the shift key 27R is depressed, the toggle spring 36 merely maintains the upper edge of the rectangular opening in member 34 in contact with the shaft 21 while the parts are moving to the position of Fig. 4. This causes the lug 34c to travel to meet the pin 20c at about the point where the highest part of the tread of cam 24a engages the power roller 23 as in Fig. 4. Thereafter, the action of the toggle spring 38 on the plate 20, assisted by the weight of the type basket, causes the pin 20c to press against the lug 34c and thereby try to push the buffer member 34 upwardly and to the right in Fig. 4.

After the pin 20a has passed the dead center position as in Fig. 4, spring 38 tends to rapidly actuate the type basket to the lower position but the contact of the pin 20c with the lug 34c restrains the plate 20 and thereby restrains the type basket. The force exerted by the spring 38 and the weight of the type basket on the plate 20 and, through pin 20c on the buffer member 34, is communicated to the lever 30 and tends to rock said lever 30 in a counterclockwise direction, thus exerting a pull on the link 29 supplementing the pull exerted by the spring 32. The cam unit 24, through the combined effect of the springs 32 and 38, tends to rock clockwise back to the position of Fig. 1 but, due to the shape of the tread on the cam 24a, as illustrated by Fig. 5, the rate at which the cam unit 24 is restored to the normal position will depend upon the rolling action between the cam 24a and the power roller 23.

Figures 5, 6:
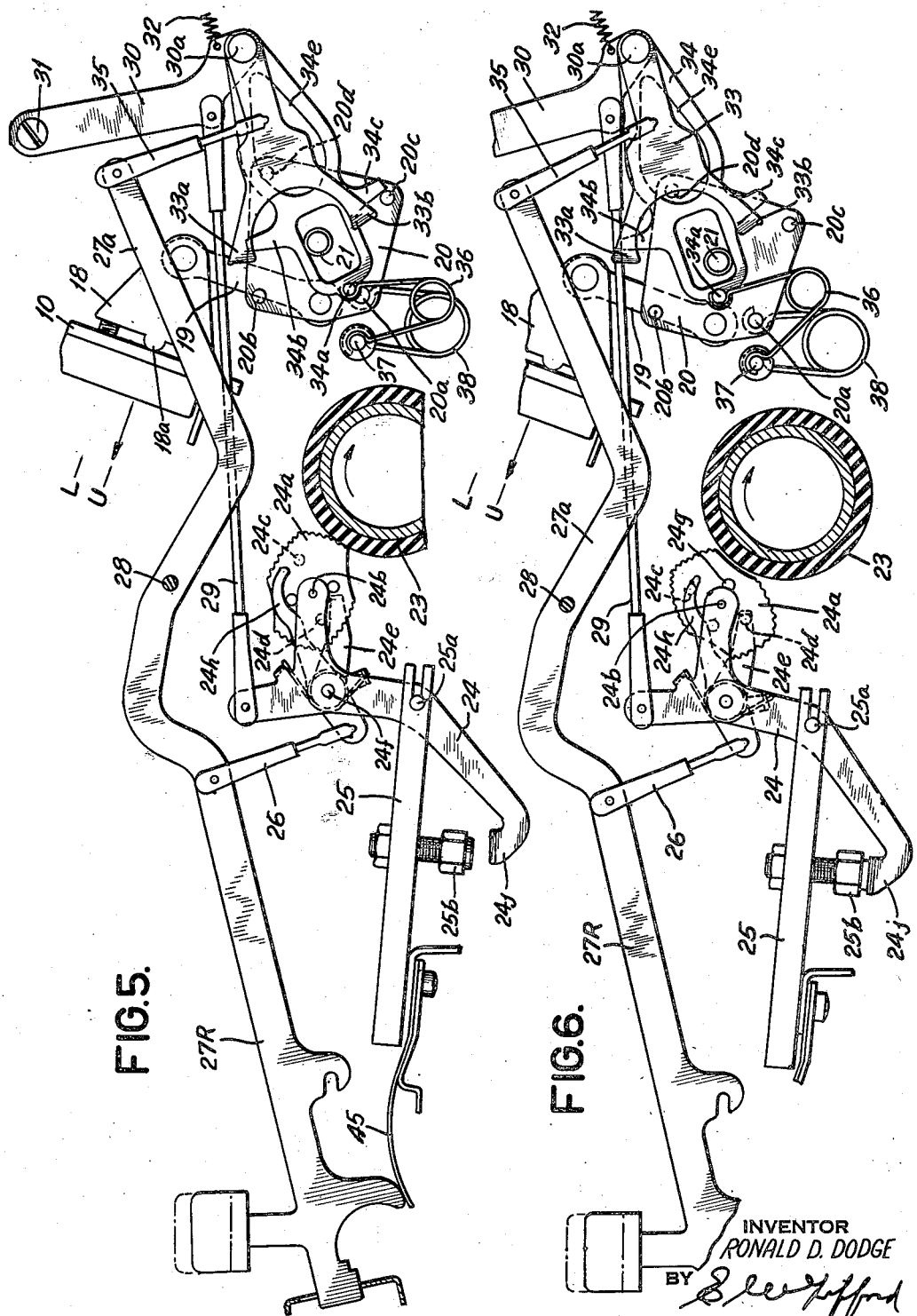
Fig. 5 is a view showing the type basket fully shifted to upper case position but with the cam unit almost fully restored.
Fig. 6 shows the type basket fully shifted or upper case position and with the cam unit and parts connected thereto fully restored ready for a second shift operation when the shift key is released.

The cam 24a is so shaped that the cam 24a, the link 29, arm 30, and buffer member 34 move to the right from the position of Fig. 4, through the position of Fig. 5, to the position of Fig. 6 at a controlled rate, which is smoothly decelerating in its action, thereby preventing the type basket from arriving at its upper case position with a slam. Thus, the type basket comes smoothly to rest.

Fig. 5 illustrates the transitional movement from the point in Fig. 4 where the spring 38 takes effect to the position of Fig. 6 where the cam unit 24 is fully restored and the type basket has been fully shifted down to the upper case position in which the operator is still maintaining the shift key depressed.

When the cam 24a completes 180° of movement (Fig. 6), the second pin 24d engages the lug on the trip lever 24e and arrests the cam against further rotation. The pin 24d is located nearer the pivot 24b than the pin 24c and, when the shift key 27 is depressed, the lug on the release lever 24e is positioned in the arcuate path of movement of the pin 24d. Also the second pin 24g engages the arm 24h when the cam nears the end of the 180° rotation and lifts it slightly and then passes to a position where the arm 24h presses on said pin in a manner to tend to rotate the cam 24a counterclockwise and thereby hold the pin 24d in engagement with the lug on the trip lever 24e as shown in Fig. 6.

While the buffer member 34 is moving from the position of Fig. 5 to the position of Fig. 6, the pin 20d, by engagement with the upper wall of the opening 34e, causes the buffer member 34 to be raised by a camming action until the pin 34a is above a dead center position with respect to toggle spring 36 and pin 37, which spring thereupon snaps the buffer member 34 to the position of Fig. 6 in which the lower wall of the rectangular opening therein is in engagement with the shaft 21. With the shift key 27R still held depressed, the operator now proceeds to type one or more upper case characters.

The key 27R is connected with a similar key 27L (Fig. 2) on the left hand side of the machine by means of a bail 39 formed of a length of rod with a crank at each end, the pin of which is received in blocks 40 carried by the side plates 16. Thus, when either shift key 27R or 27L is depressed, the shift mechanism is rendered operative to shift the type basket 10 to the upper case position in the manner described above.

The machine is also provided with a shift lock key 42 pivoted on the stud 28a. This key has a pivotal connection at 43a to a key locking latch 43 which is pivoted at 27c to the shift key 27L. When the shift lock key 42 is depressed, the latch 43 is rocked slightly counterclockwise (Fig. 1) into engagement with a latch plate 44 fixed to the frame member 25 but the latch plate 44 prevents further rotation, for the moment, of the latch 43 with the result that the latch piece is constrained to travel almost vertically downwardly, thereby carrying with it the shift key 27L until ultimately the hook-shaped portion 43b of the latch piece 43 registers with an aperture in the plate 44, thus permitting the latch piece 43 to rock an additional distance counterclockwise into latching engagement with the plate 44.

The portion 43b of latch 43 is slightly undercut so that when the shift lock key 42 is released the latch piece 43 is only permitted to rise slightly and will be held in engagement with the latch plate 44, this engagement being maintained by one of the prongs of a spring-comb 45 which has prongs for both of the shift keys 27 and tends to restore said keys. Thus, the shift key is maintained in depressed condition by the latch piece 43. A slight downward movement of either shift key 27R, 27L will release the latch 43.

When it is desired to shift back to lower case, the operator either releases the particular shift key 27R or 27L, whichever is being held down by hand, or if the shift keys are held down by latch 43, one of the shift keys is slightly depressed, permitting the latch 43 to disengage from the plate 44 and permitting the shift keys to rise.

The sequence of operations involved in shifting from upper case to lower case is illustrated by Figs. 7 to 9 which disclose positions very similar to Figs. 3 to 5 but with the positions of the parts 33, 34 reversed. When the shift key 27 is released the release lever 24e moves back to the position of Fig. 1, thereby disengaging the lug thereon from the pin 24d of cam 24a. This allows the cam to rotate slightly counterclockwise and engage the power roller 23 as in Fig. 3 and the cam unit becomes partly operated as in that figure. By the operations described in reference to Figs. 3 to 6, the pin 20c has been moved to the right so as to be directly under the lug or extension 33b of the actuating member 33.

As soon as the shift key is released the link 35 drops (Fig. 7) and lowers the actuating member 33 to place the lug 33b a little to the right of the pin 20c, and the initial rotation of the cam unit to the position of Fig. 7 brings the lug 33b into engagement with the pin 20c. With continued movement of the cam 24a approximately 90° to the position of Fig. 8, the plate 20 will be rocked clockwise. This movement brings the lug 34b into engagement with the pin 20b and during the movement of the parts to the position of Fig. 8 the toggle spring 38 is over-balanced in the opposite direction and tends to rotate the plate 20 back to the position of Fig. 1; that is, in a clockwise direction with reference to Fig. 8.

However, just as in the case of Fig. 5, the plate 20 and consequently the type basket cannot snap back to the position of Fig. 1 but are compelled to move at a rate determined by the shape of the serrated tread portion on the cam 24a, exactly as described above, during the last 90° of movement of the cam 24a. Here again the type basket is caused to gradually be decelerated back to the lower case position as shown in Fig. 9 which illustrates a transition position during the period of deceleration determined by the shape of the serrated tread on the cam. During this period the pin 20d will engage the lower edge of the opening 34e and cause the buffer member 34 to rock in a counterclockwise direction to the position shown in Fig. 9, the lug 34b, however, being disengaged from the pin 20b very close to the point at which the type basket reaches the lower case position so that the decelerating movement of the type basket is controlled right up to the point at which the type basket is arrested by its limiting stops.

During the restoration of the type basket to the lower case position the spring 38 is assisted by the leaf springs 15 on which the type basket is mounted and which are flexed when the type basket is moved to the upper case position shown in Fig. 6.

The cam 24a is so shaped that, with the first 90° of movement thereof, the type basket is smoothly accelerated a little more than half way to the lower case position of Fig. 4 and then is decelerated to the lower case position of Fig. 6 until it comes to rest virtually without shock and this sequence is repeated when the type basket is moved back to the lower case position. The cam 24a is symmetrical and the plate 20, actuating member 33, and the buffer member 34, are all symmetrical with respect to the location of the pins 20a to 20d and the lugs 33a, 33b, and 34b, 34c. Consequently the movement from upper case position to lower case position is identical in every respect with the movement from lower case position to upper case position.

While there have been shown and described and pointed out the fundamental novel features of the invention, as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A case shift mechanism comprising a case shiftable part, a power device including a power roller and a cam unit having a double lobe cam rotatable by the power roller, each lobe having an accelerating portion and a decelerating portion, means to render the power device operative, a member movable back and forth between two case shift positions and connected to said shiftable part, an actuating member connected to said cam unit and actuated once for each lobe of said cam with first a forward accelerating movement and a restoring decelerating movement, said actuating member being positionable to enable the accelerating portion to first partially move said movable member toward one case position and then partially move the movable member back to the initial case position, each of said movements being effected by one of said lobes; spring means for completing said movements while the restoring decelerating movements take place, and a retarding member positioned by said movable member and connected to said power device to retard said spring means during said decelerating movements.

2. A shift mechanism comprising a case shiftable part, power mechanism for effecting case shift movements of said part including a cam having an accelerating portion for effecting a positive forward accelerating movement toward case position and a restoring decelerating movement, means including a member actuated by said power mechanism for communicating an initial driving movement from the accelerating portion of said cam to said case shiftable part, means rendered effective by said member for completing said driving movement to carry said case shiftable part to case shifted position while the decelerating portion of said cam is effective, and means controlled by the decelerating portion of said cam for decelerating the case shiftable part to rest in case shifted position.

3. A case shift mechanism comprising a case shiftable part, a power roller, a rock lever; a cam rotatable on said lever and having two lobes, each lobe having an accelerating portion and a decelerating portion, said cam being capable of rolling contact with said power roller; means including a key for causing two successive half revolutions of the cam by the power roller consequent upon depression and release of said key, each half revolution causing an oscillation of said lever; an oscillatable member connected to said case shiftable part and having two projections, a pivoted arm oscillated by said lever, a coupling member pivoted on said arm and normally positioned by said key to engage one of said projections when the key is in normal position and shiftable to engage the other projection when the key is depressed, said coupling member and cam being rendered effective by said key to shift said oscillatable member and the case shiftable part first toward and then away from a case position by virtue of said accelerating portions of said cam, means for completing said movements of said oscillatable member while the decelerating portions of said cam have rolling contact with said power roller, and a member alternately shiftable by the oscillatable member into the paths of said projections and connected to said arm for restraining the movement of the oscillatable member under the influence of the completing means.

4. A case shift mechanism comprising a case shiftable part, a power roller, a rock lever; a cam rotatable on said lever and having two lobes, each lobe having an accelerating portion and a decelerating portion, said cam being capable of rolling contact with said power roller; means including a key for causing two successive half revolutions of the cam by the power roller consequent upon depression and release of said key, each half revolution causing an oscillation of said lever; a driven member connected to said case shiftable part and having a forward and back motion to and from a case position, said driven member having two projections; a driving element connected to said lever and movable by depression of said key to engage one of said projections to enable one of said accelerating portions to partly move said driven member toward said case position and, upon release of the key, movable to engage the other of said projections to enable movement of the driven member away from said case position by the other of said accelerating portions; means rendered effective by the movements imparted to the driven member for completing said movements while the decelerating portions of the cam have contact with the power roller, and means connected to said lever and coacting with said projections while the decelerating portions have contact with the power roller for retarding the movement of the driven member and decelerating the driven member to rest.

5. In a case shift mechanism, a driven member movable between two case positions, yielding means to maintain said driven member in one or the other of said positions and operative, when the driven member is moved part way from either position toward the other position, to continue said movement, power mechanism, including a driving member for moving the driven member part way toward each position, and including a cam having a decelerating portion, and means controlled by said decelerating portion and engageable with said driven member for restraining said yielding means.

6. In a case shift mechanism, means movable between two case shift positions; means operative, when the movable means is given an initial movement from either case position toward the other, for continuing said movement; power means for giving said movable means said initial movement, including a driving member having an accelerating motion in one direction to move said movable means part way and a decelerating restraining motion in the opposite direction while the continuing means is moving said movable means, and means enabling the decelerating motion of the power means to retard the movable means to rest.

7. In a case shift mechanism, a driven member movable between two case positions; means rendered effective, when the driven member is moved part way from one of said case positions toward the other, for completing movement of the driven member; a power device for imparting said part way movement to said driven member, including a driving member and a cam for moving the driving member with accelerated motion in one direction and permitting constrained decelerating motion of said member in the opposite direction, said driving member having alternate selective driving engagement with the driven member, and a retarding device connected to said power device and having alternate selective engagement with the driven member to enable the decelerating motion of said driving member to control the first named means.

8. The invention as set forth in claim 6 wherein the enabling means includes an element connected to the power means and held out of engagement with the movable means while the latter is being moved part way and then movable into the path of the movable means while the moving means is continuing movement of the movable means.

9. The invention set forth in claim 8 wherein the enabling means further includes a toggle spring acting upon said element to move it between alternate positions of engagement with the movable means in response to motion imparted to said element by said movable means.

RONALD D. DODGE.

REFERENCES CITED

The following references are of record in the file of this patent:

UNITED STATES PATENTS

| Number | Name | Date |
| --- | --- | --- |
| 1,789,808 | Dorsey | Jan. 20, 1931 |
| 1,945,097 | Thompson et al. | Jan. 30, 1934 |